United States Patent [19]

Doddapaneni

[11] Patent Number: 4,621,036

[45] Date of Patent: Nov. 4, 1986

[54] HALOGENATED ORGANIC SOLID DEPOLARIZER

[75] Inventor: Narayan Doddapaneni, Glenside, Pa.

[73] Assignee: Honeywell Inc., Minneapolis, Minn.

[21] Appl. No.: 773,107

[22] Filed: Sep. 6, 1985

Related U.S. Application Data

[63] Continuation-in-part of Ser. No. 653,797, Sep. 24, 1984, abandoned.

[51] Int. Cl.$^4$ .................. H01M 6/14; H01M 4/60; C07D 487/00
[52] U.S. Cl. .................. 429/194; 429/213; 544/351; 544/352
[58] Field of Search .......... 429/194, 213; 544/351, 544/352

[56] References Cited

U.S. PATENT DOCUMENTS 2,964,526 12/1960 Herrick .................. 260/268

FOREIGN PATENT DOCUMENTS 50-91721 7/1975 Japan .................. 429/213

OTHER PUBLICATIONS

Dabco, Triethylenediamine 1,4–Diazabicyclo-[2.2.2-.]octane: Properties, Reactions and Applications.
Chemical Abstracts: 90: 214414 (1979) 70: 23599 (1969) 69: 19121 (1968).

Primary Examiner—Brian E. Hearn
Assistant Examiner—Stephen J. Kalafut
Attorney, Agent, or Firm—Charles G. Mersereau

[57] ABSTRACT

Certain solid organic depolarizers are disclosed for use in non-aqueous active metal cells which allow such cells to achieve both high voltage and high capacity with greater enhanced stability. The depolarizers include halogen adducts of triethylenediamine, also known as 1,4 diazabicyclo [2.2.2] octane such as N,N'-tetrachloro triethylenediamine.

15 Claims, 2 Drawing Figures

Li/$C_6H_{12}N_2Cl_6$ CELL WITH (Li$AsF_6$+Li$BF_4$)/METHYL FORMATE ELECTROLYTE AT 0.1 mA/cm$^2$ AND 23° C.

DISCHARGE CHARACTERISTICS OF Li/$C_6H_{12}N_2Cl_4$ IN (LiAsF$_6$ + LiBF$_4$)/METHYL FORMATE ELECTROLYTE AT 0.5 mA/cm$^2$ AND 23°C.

HALOGENATED ORGANIC SOLID DEPOLARIZER

This application is a Continuation-in-Part of application S.N. 653,797, filed Sept. 24, 1984, now abandoned.

BACKGROUND OF THE INVENTION

1. Field of the Invenion

The invention relates to the field of non-aqueous electrochemical cells and, more particularly, to solid halogenated organic depolarizers for a high-rate non-aqueous electrochemical cell.

2. Description of the Prior Art

Much work has been done in the field of high energy battery systems utilizing highly reactive anode materials such as alkali metals in combination with non-aqueous electrolytes. The electrolyte is normally composed of a solute which is commonly a metal salt or a complex metal salt of group I-A, II-A or III-A elements of the Periodic Table dissolved in a compatible non- aqueous solvent. The batteries often are used in applications which require them to be operable over a wide temperature range with a high output over that wide temperature range. For this reason, much research has been conducted concerning the development of solvent-solute pairs which are stable and have a high ionic conductivity over a wide temperature range. In addition, it is desirable that the chemical system of the electrochemical cell have a long, stable shelf life when used in a primary or secondary battery system. The prior art is replete with many examples of such high capacity or high rate cells which utilize solvents containing sulfur dioxide ($SO_2$), thionyl chloride ($SOCl_2$) and sulfuryl chloride ($SO_2Cl_2$). These compounds, along with certain other oxyhalides, are normally used in combination with an alkali metal anode or alkaline earth metal anode and an electrolyte consisting of a salt of a cation of the metal of the anode together with the solvent materials.

The basic problem with the electrochemical cells of the prior art utilizing sulfur dioxide, thionyl chloride or sulfuryl chloride has been the problem with safe storage and operation of the batteries. Under certain circumstances, the batteries tend to experience thermal runaway in which reactions and pressure buildup within the cell may actually cause a very violent explosion. One reason for this occurrence has been traced to reactions which occur between the metal anode and the sulfur of the solvent material. In addition, because sulfur dioxide is a gas at ordinary temperatures, overheating or the use of such batteries at higher temperatures may lead to the buildup of excessive pressure within the cell.

One prior art solution to this problem has been the provision of a liquid organic solvent depolarizer system which eliminates the need for any sulfur- containing compounds in the system. A example of this is formed in U.S. Pat. No. 4,439,503. Another U.S. Pat. No. 4,132,837 discloses the use of macroheterocyclic organic compounds to stabilize organic polar aprotic solvents in such a system.

Another approach has been to use solid cathode depolarizers. In the prior art several inorganic solid cathode depolarizers such as $MnO_2$, $FeS_2$, $CuS$ and $Ag_2CrO_4$ have been used successfully in active metal, non-aqueous cells. But cells using lithium anodes and $CuS$ or $FeS_2$ have generally low operating voltages, i.e., less than 1.6 volts and 2.0 volts, respectively, even at very low discharge rates. Cells, employing $MnO_2$ or $Ag_2CrO_4$ in combination with lithium anodes have a higher operating voltage of about 2.8 volts. It has been found, however, that the Li/$MnO_2$ cell voltage drops during discharge and the Li/$Ag_2CrO_4$ cells are very expensive in comparison.

SUMMARY OF THE INVENTION

By means of the present invention, it has been discovered that the use of certain solid organic depolarizers in the active metal cell environment allows such cells to achieve both high voltage and high capacity with greater enhanced stability. The depolarizers include N,N'-halogen and inter-halogen adducts of triethylenediamine, $C_6H_{12}N_2X_4$. Triethylenediamine is also known as 1,4 diazobicyclo [2.2.2]octane. The addition or adduct compounds of the present invention have the following general structural formula:

where X represents any halogen atom selected from I, Br, CL and F. One exemplary such compound is N,N'-tetrachloro triethylenediamine adduct which may be represented as follows:

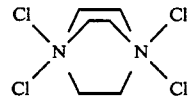

In the preferred embodiment the adduct compounds are synthesized by reacting the triethylenediamine in an appropriate organic solvent with the desired halogen or mixture thereof. The depolarizer is incorporated as the main constituent of the cathode of the electrochemical cell along with carbon and a polytetrafluoroethylene (PTFE) binder. One cell embodiment used a lithium anode, an electrolyte of 0.5M $LiBF_6$ +2.0M $LiAsF_6$ in methyl formate. The preferred depolarizer is N,N'-tetrachloro triethylenediamine. The system of the invention allows the fabrication of both primary and secondary cells and both type cells have been successfully made utilizing the preferred depolarizer. This is not possible with most prior art cathode depolarizers which have been used in active metal non-aqueous cells.

DESCRIPTION OF THE PREFERRED EMBODIMENT

The depolarizer compounds of the present invention can be readily synthesized from triethylenediamine, $C_6H_{12}N_2$ (1,4 diazobicyclo [2,2,2]octane) available from Air Products and Chemicals, Inc. of Allentown, Pa. The desired depolarizer is made by reacting the triethylenediamine with the desired halogen or mixture thereof in an appropriate inert organic solvent. The reaction proceeds fairly rapidly at ambient or slightly elevated temperatures, i.e. less than 100° C.

EXAMPLE I 11.2 g of triethylenediamine, also known as 1,4 diazobicyclo [2,2,2] octane, was dissolved in 200 cc of carbon tetrachloride. Chlorine gas was bubbled through the solution while stirring at ambient temperature. A white precipitate formed. After two hours of bubbling chlorine gas, the product was separated by filteration and washed with carbon tetrachloride to purify and remove any unreacted triethylenediamine. After drying at 70° C. for four hours, the product weighted 24.3 g. The product had the following structure:

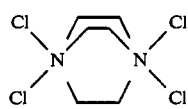

EXAMPLE II

The same procedure was used as in Example I except that the solvent used was chloroform instead of carbon tetrachloride. The same result was noted.

In accordance with the present invention, a number of cells were constructed employing a lithium anode, an electrolyte consisting of $LiBF_6 + LiAsF_6$ in methyl formate and a carbon cathode containing the organic halogenated cathode depolarizer. One embodiment utilized a lithium anode with an electrolyte consisting of 0.5M $LiBF_6$ +2.0M $LiAsF_6$ in methyl formate. The cathode consisted of a mixture of approximately 85% N,N'-tetrachloro triethylenediamine adduct, 10% graphite and approximately 5% PTFE powder binder. The mixture was thoroughly blended together in powder form and thereafter was made into pellet form by subjecting the mixture to a 10,000 pound per square inch pressure in a hydraulic press. A nickel current collector grid was then attached. This produced a composite cathode having an approximate thickness of 0.080 inches. In constructing the cell a Celgard (trademark of Celenese Corporation) polyethylene separator of approximately 0.006 inches of thickness was also used in the cell. Of course, binders other than PTFE and current collectors other than nickel may be used.

Figure 1:
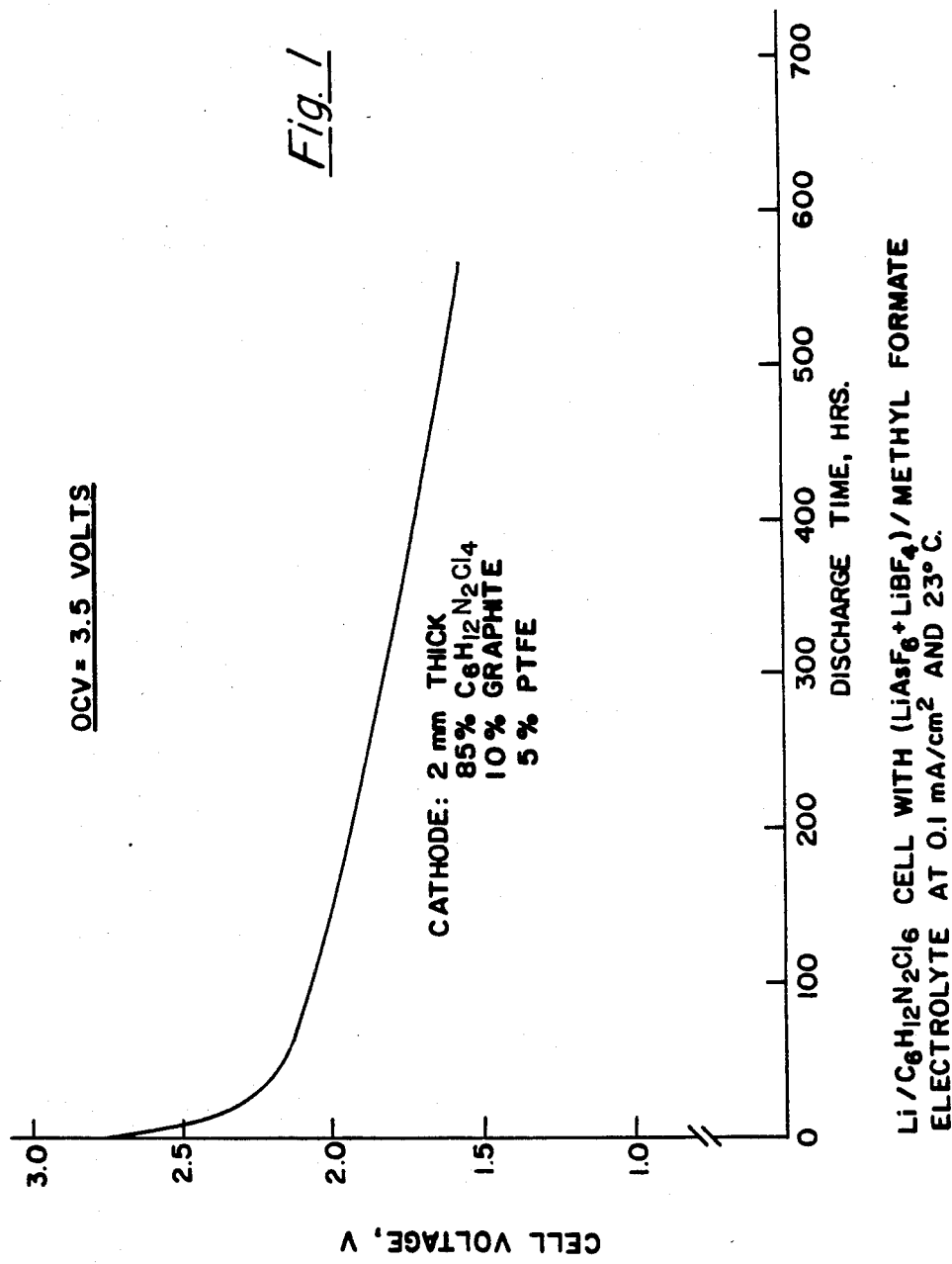
FIG. 1 is a graphical representation of the discharge characteristics of a cell utilizing the invention.
Figure 2:
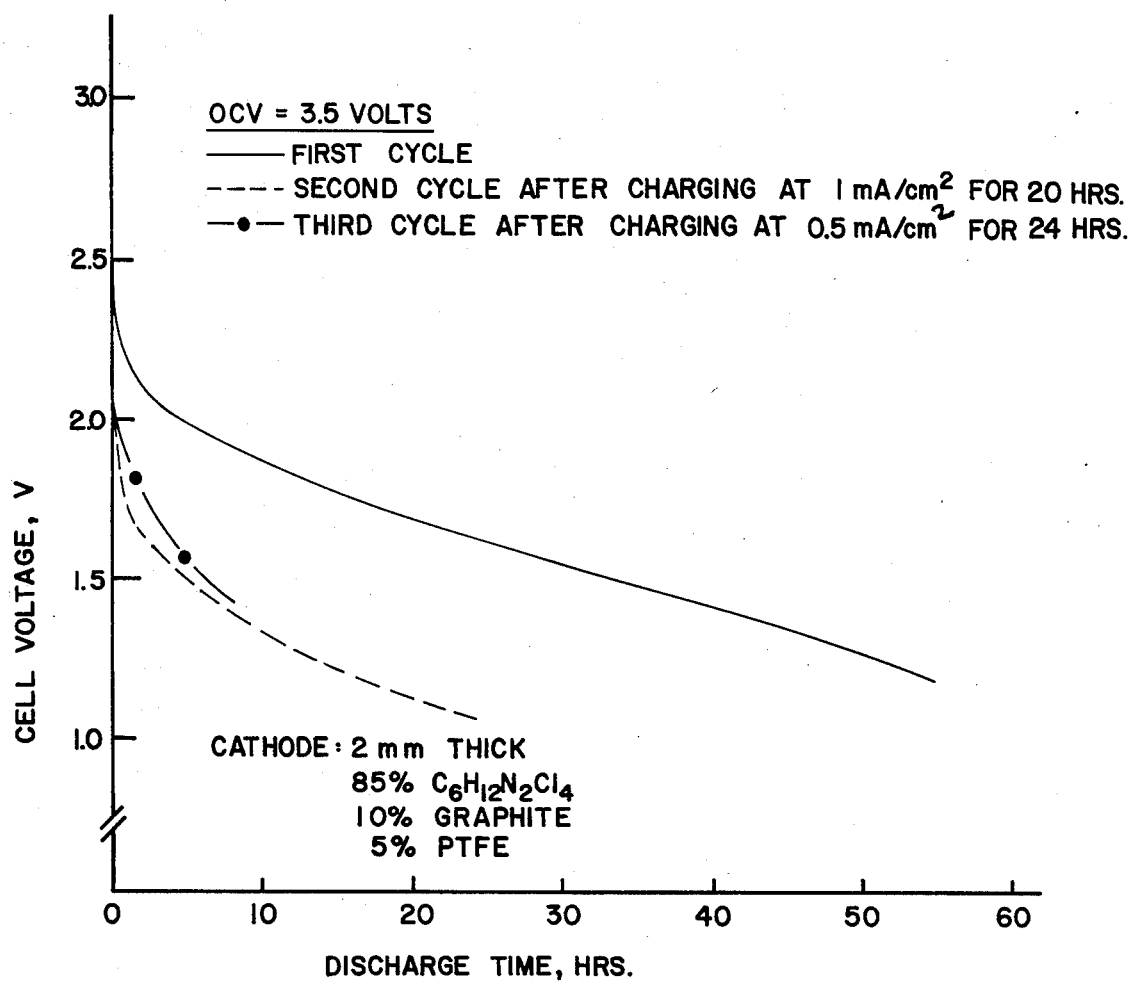
FIG. 2 is a graphical representation of the discharging characteristics of a cell utilizing the invention both befor and after recharging.

FIG. 1 and curve A of FIG. 2 illustrate graphically the discharge characteristics of a cell fabricated as previously described at a constant current density of 0.1 $mA/cm^2$. It has further been found that the cathode capacity as such is achieved with such a cell is approximately 60mAH/$cm^2$ to a cut-off voltage of approximately 1.70 volts. The observed open circuit voltage is approximately 3.5 volts.

In addition, it has also been found that the cells made in accordance with the invention can be recharged in the manner of a secondary cell. This is illustrated by curves B and C of FIG. 2. Because the halogen adduct compounds utilized in the cell of the present invention are highly stable in the cell environment, it is contemplated that long-lived secondary batteries utilizing the solid cathode depolarizers of the invention can be successfully fabricated.

Whereas the above cell utilizes an N,N'-tetrachloro adduct of the triethylenediamine, other halogens and mixtures thereof appear to be quite successful also.

The embodiments of the invention in which an exclusive property or right is claimed are defined as follows:

1. The chemical adduct compounds

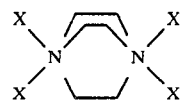

wherein X is selected from the group consisting of chlorine and fluorine or an inter-halogen combination thereof.

2. The chemical compound of claim 1 wherein X is Cl.

3. The method of making a compound of the class

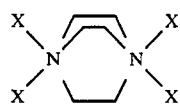

wherein X is selected from the group consisting of chlorine and fluorine or inter-halogen combination thereof, said method comprising the steps of
  dissolving triethylenediamine in an inert organic solvent;
  introducing elemental halogen selected from the group consisting of $Cl_2$ and $F_2$ or a combination thereof into the solution at a temperature below 100° C., wherein the quantity of halogen is form; and
  recovering the N,N'-tetrahalo derivative from the solution.

4. In a non-aqueous electrochemical cell having an active metal anode an electrolyte solution containing a salt of the active metal of the anode in a compatible organic solvent and a cathode, the improvement comprising a solid organic depolarizer incorporated in said cathode wherein said depolarizer is one selected from the group consisting of halogen and inter-halogen adducts of triethylenediamine or combinations thereof of the following structure:

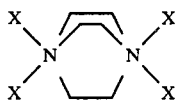

wherein X is a halogen selected from the group consisting of CL and F or inter-halogen combinations thereof.

5. The apparatus of claim 4 wherein said cathode depolarizer is N,N'-tetrachloro triethylenediamine adduct.

6. The apparatus of claim 5 wherein said cathode comprises approximately 85% of said depolarizer, 10% graphite and 5% PTFE binder.

7. An electrochemical cell comprising:
  a lithium anode;
  an electrolyte comprising an amount of $LiBF_6$ and $LiAsF_6$ in methyl formate;
  a solid cathode comprising an amount of N,N'-tetrahalo derivative of tetraethylenediamine and graphite together with an amount of PTFE binder; wherein said N,N'-tetrahalo derivative is one selected from the group consisting of N,N'-tetrachloro, N,N'-tetrafluoro and interhalogen combinations thereof.

8. The apparatus of claim 7 wherein said cathode depolarizer is N,N'-tetrachloro triethylenediamine adduct.

9. The cell of claim 8 wherein said cathode comprises approximately 85% of said depolarizer, 10% graphite and 5% PTFE binder.

10. The cell of claim 4 wherein said cell is rechargeable.

11. The cell of claim 5 wherein said cell is rechargeable.

12. The cell of claim 6 wherein said cell is rechargeable.

13. The cell of claim 7 wherein said cell is rechargeable.

14. The cell of claim 8 wherein said cell is rechargeable.

15. The cell of claim 9 wherein said cell is rechargeable.

* * * * *